Jan. 21, 1941.  A. BOWLAND  2,229,165

FLUID VALVE OPERATING MECHANISM

Filed Oct. 16, 1939  9 Sheets-Sheet 4

Inventor:
ANDREW BOWLAND,
by Charles B. Spencer
his Attorney.

Jan. 21, 1941.  A. BOWLAND  2,229,165
FLUID VALVE OPERATING MECHANISM
Filed Oct. 16, 1939  9 Sheets-Sheet 5

Inventor:
ANDREW BOWLAND,
by Charles B. Spencer
His Attorney.

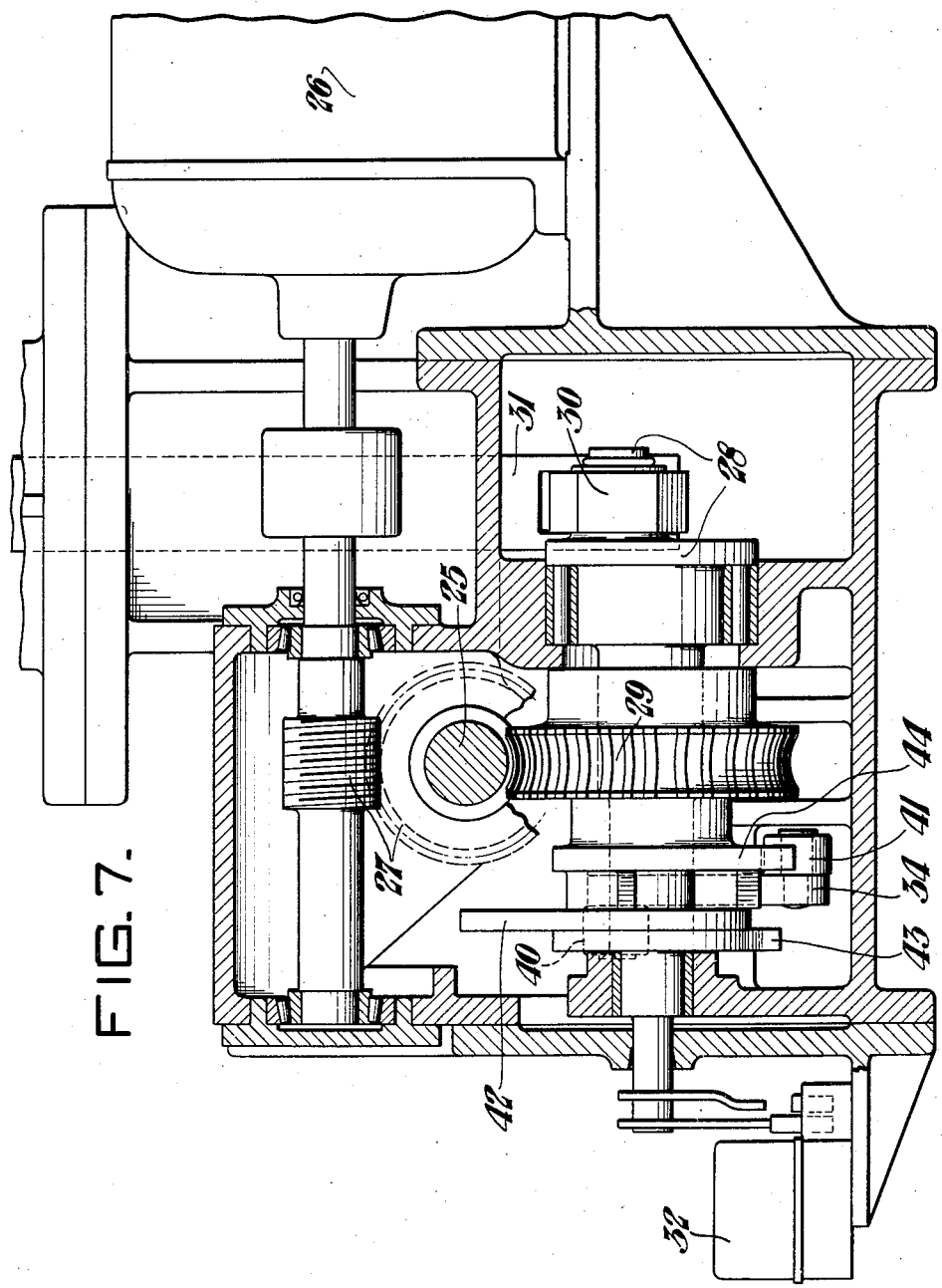

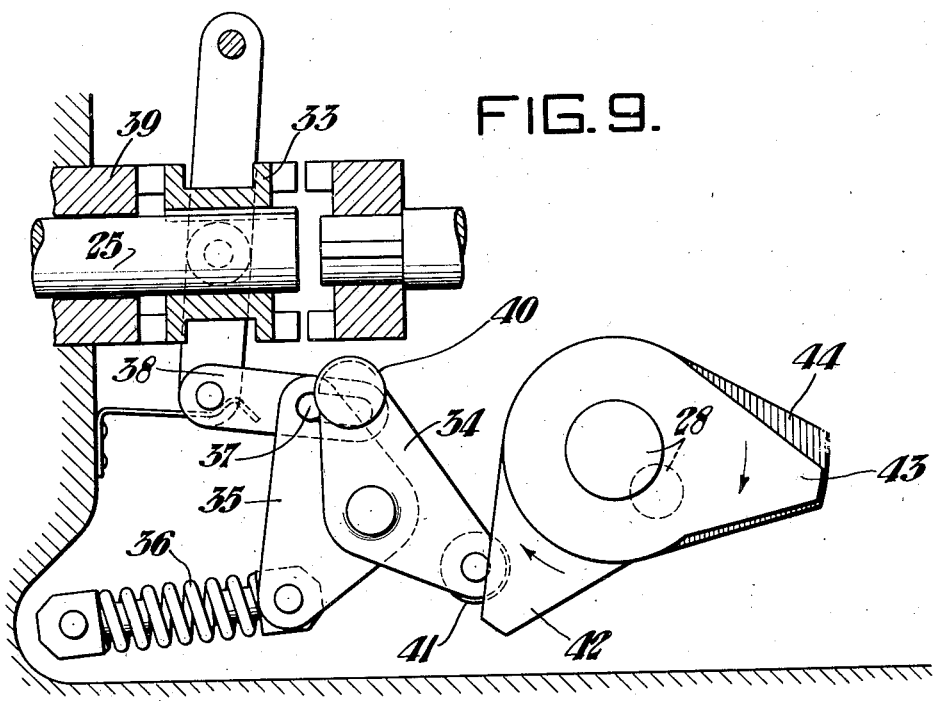
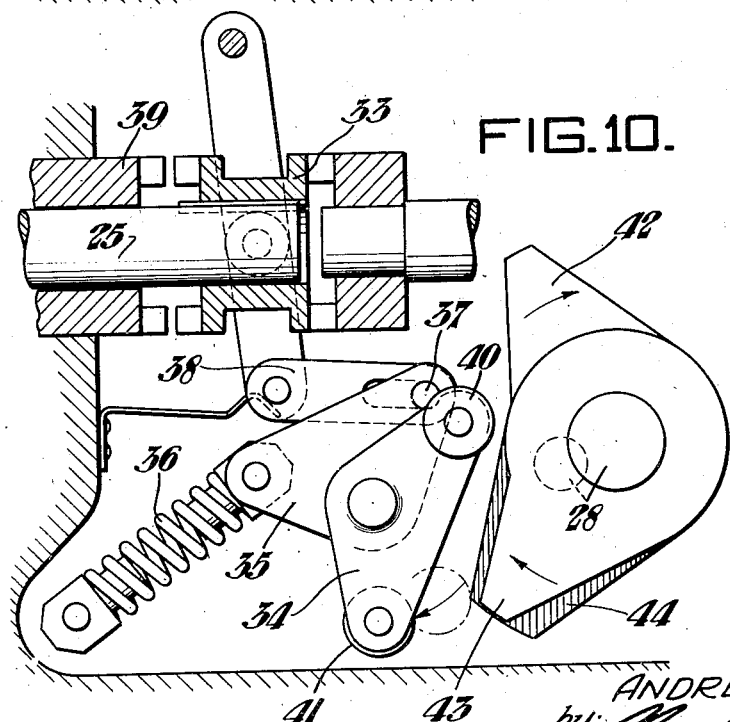

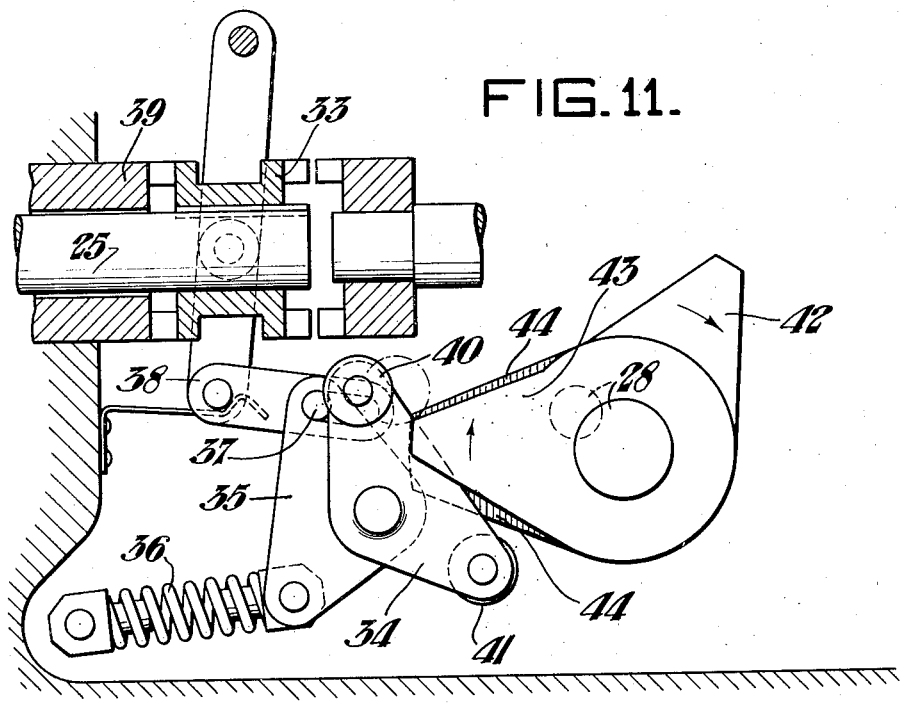
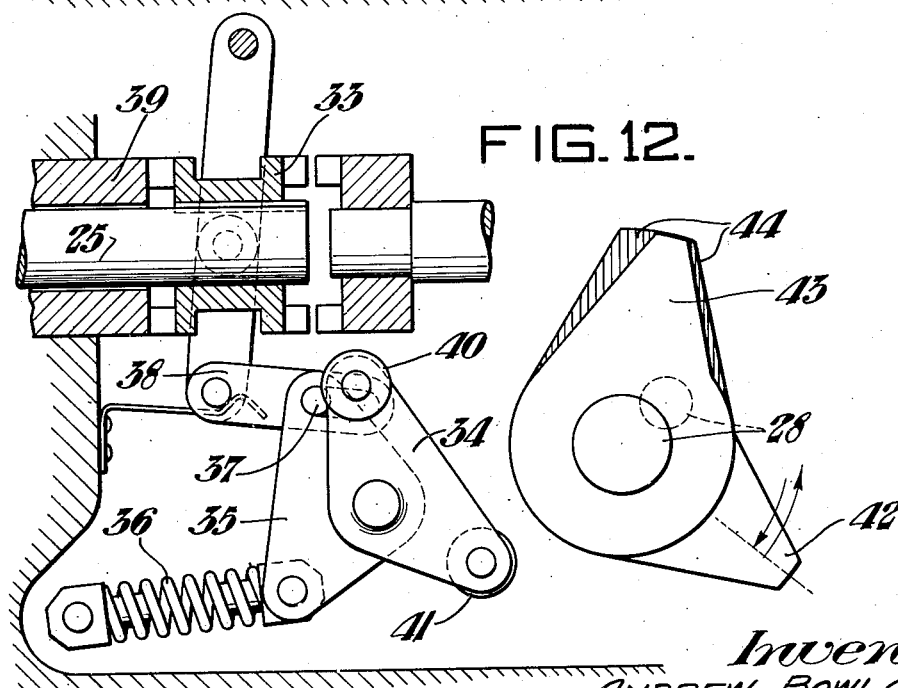

Jan. 21, 1941.  A. BOWLAND  2,229,165

FLUID VALVE OPERATING MECHANISM

Filed Oct. 16, 1939  9 Sheets-Sheet 9

Inventor:
ANDREW BOWLAND,
by Charles B. Spencer
His Attorney.

Patented Jan. 21, 1941

2,229,165

UNITED STATES PATENT OFFICE 2,229,165

FLUID VALVE OPERATING MECHANISM

Andrew Bowland, Mount Lebanon, Pa., assignor to William M. Bailey Company, a corporation of Pennsylvania Application October 16, 1939, Serial No. 299,721

10 Claims. (Cl. 137—139)

This invention relates to operating mechanisms for valves, particularly gas valves of the type disclosed by my Patent No. 2,125,253.

Two examples of valve operating mechanisms embodying the principles of my present invention are illustrated by the accompanying drawings, the various figures being as follows:

Figures 5, 6 and 7 are cross-sectionals taken from the lines V—V, VI—VI and VII—VII, respectively, in Figure 4.

Figure 8 is a section taken from the line VIII—VIII in Figure 6.

Figures 9 through 14 illustrate the operation of details shown in Figure 4.

Figure 1:
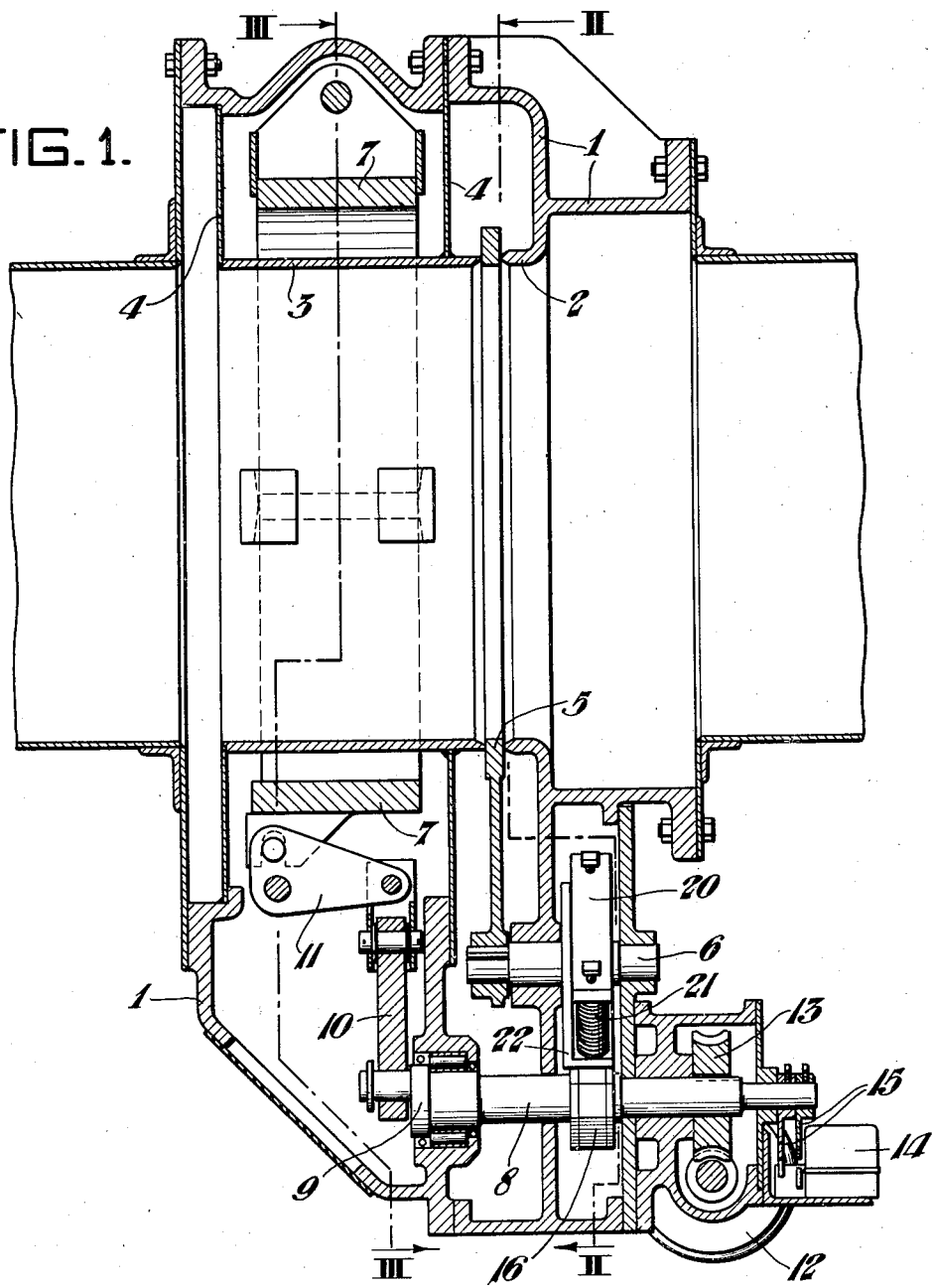
Figure 1 is a vertical section of one example.
Figure 2:
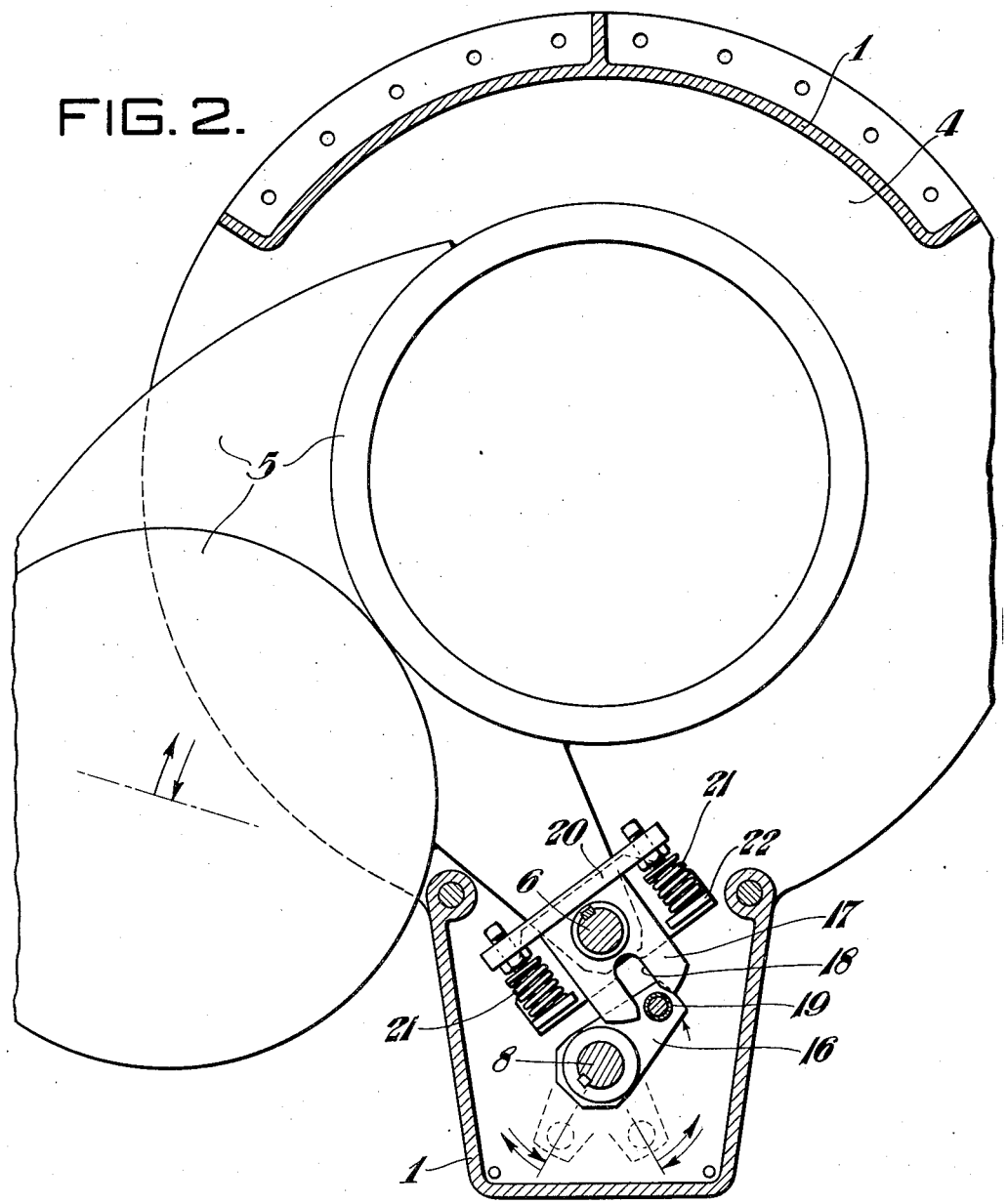
Figures 2 and 3 are cross-sections taken from the lines II—II and III—III, respectively, in Figure 1.
Figure 3:
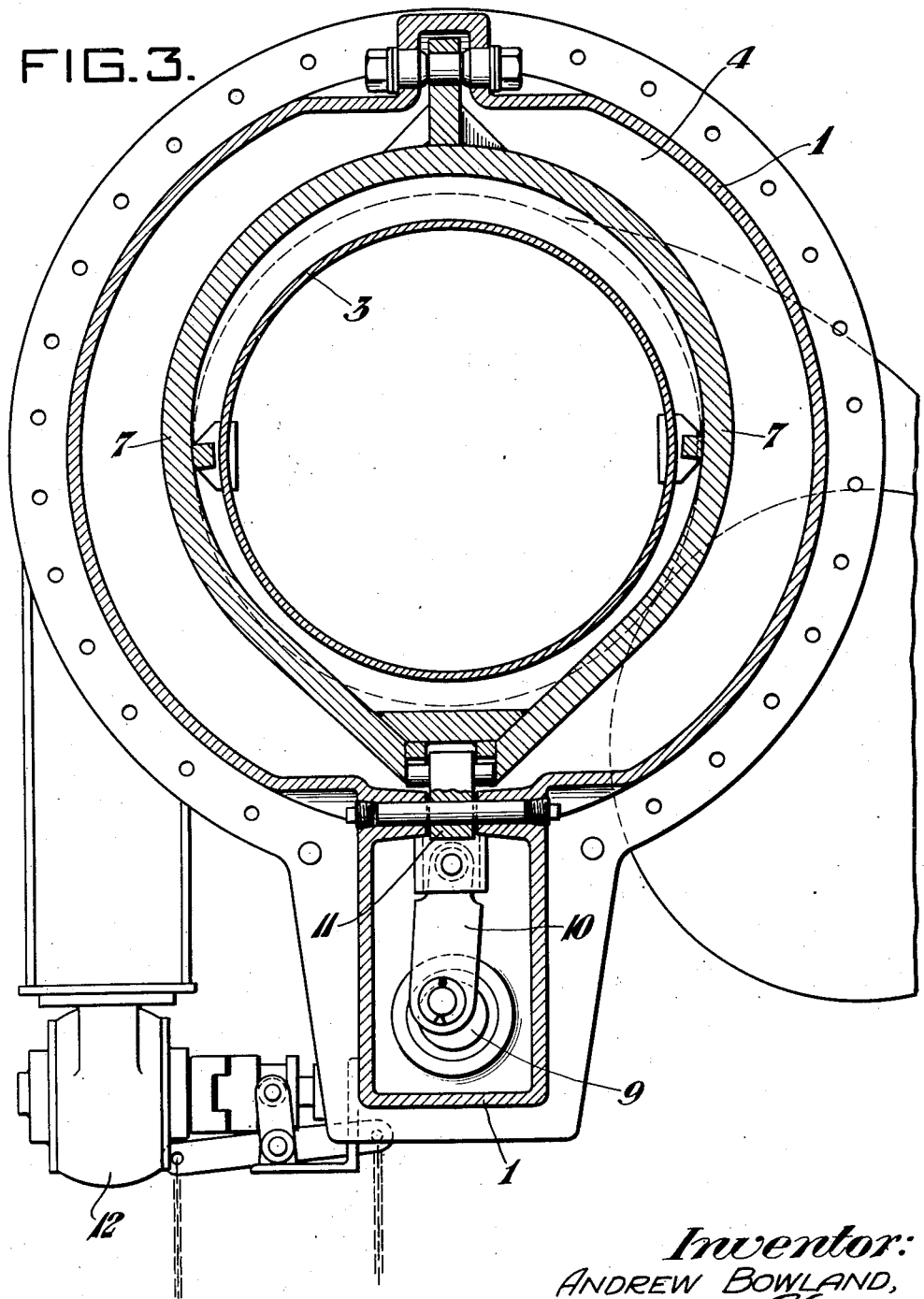
Figure 4:
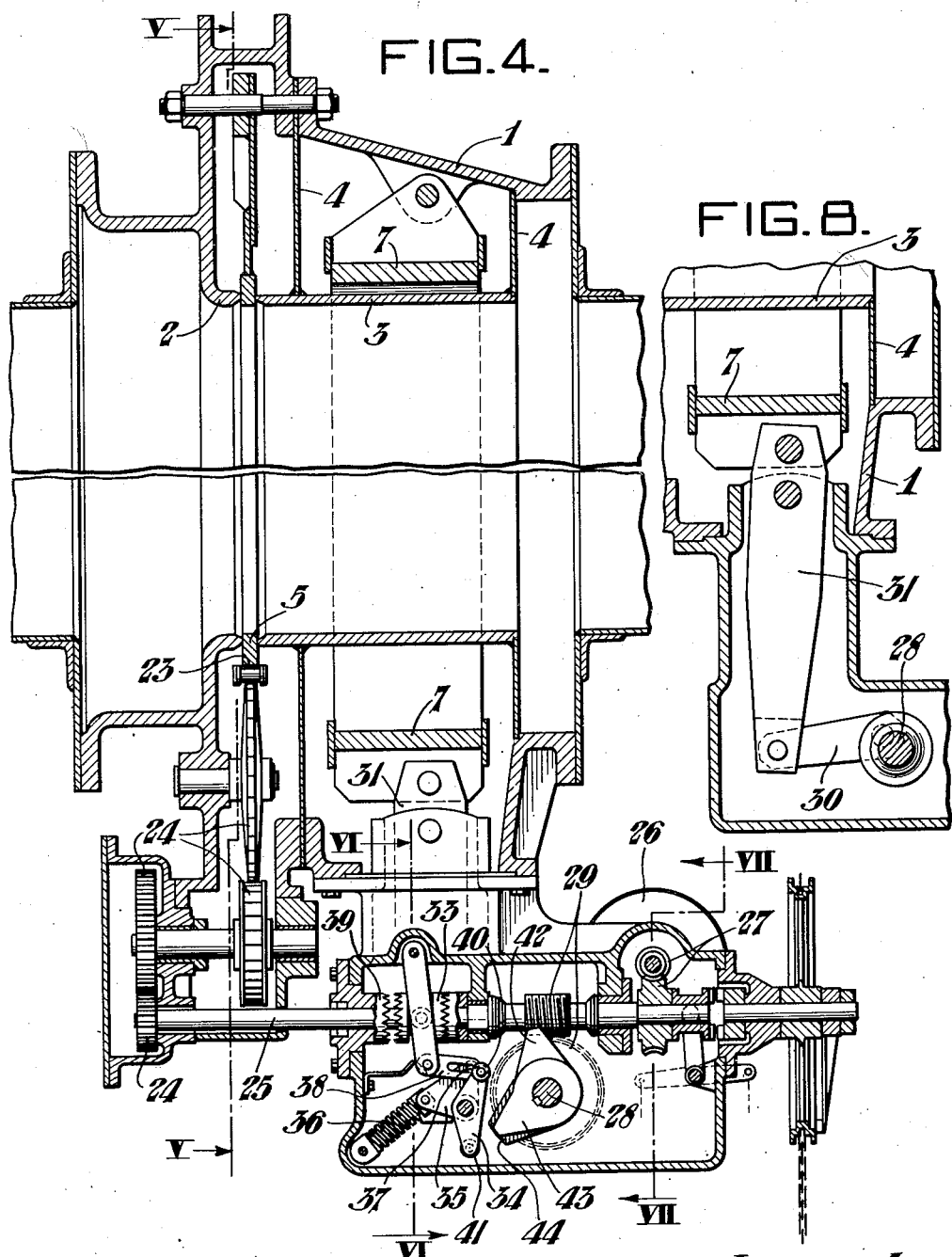
Figure 4 is a vertical section of the other example.
Figure 5:
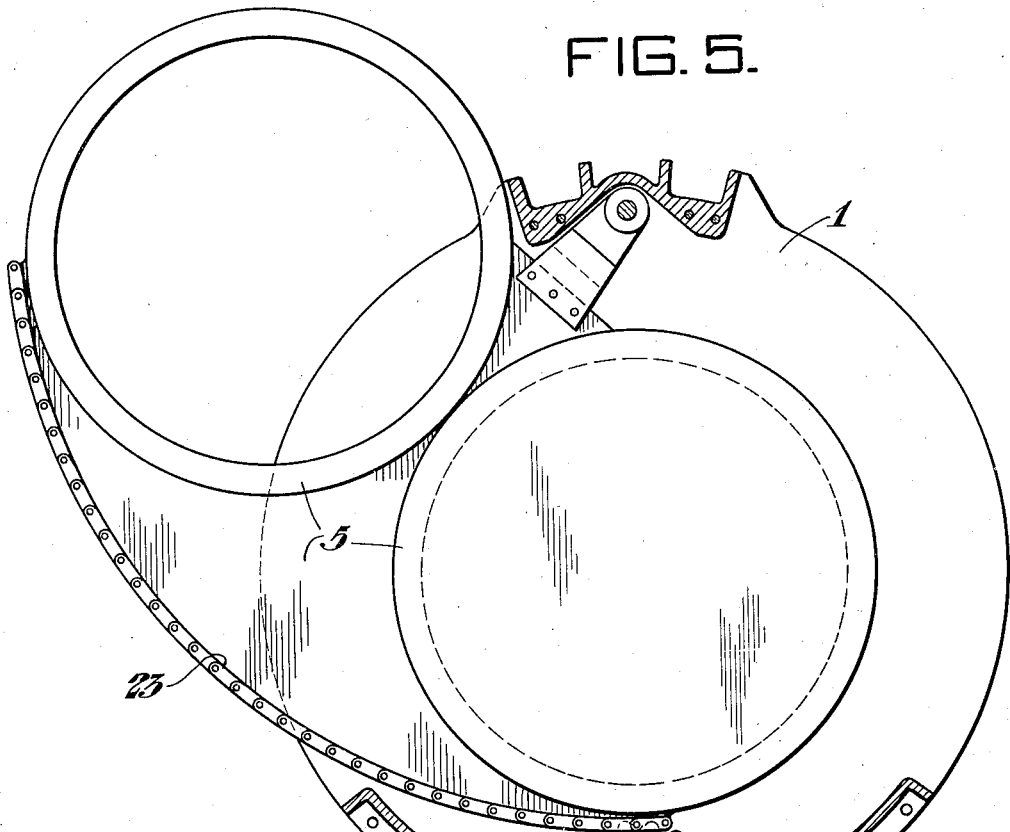
Figure 6:
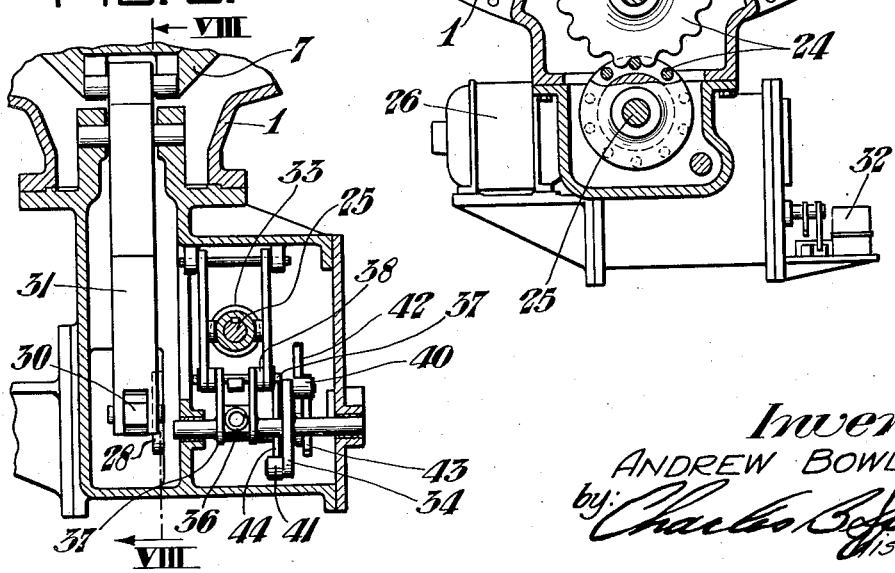

More specifically, these drawings show a casing 1 providing a fixed gas conducting section 2 and a reciprocating gas conducting section 3, the latter being mounted by spaced diaphragms 4 which are flexible so that this section 3 can reciprocate. A goggle valve plate 5 is mounted by a shaft 6 journaled in the casing 1, so that this plate can work between the sections 2 and 3 which are spaced to permit its passage therebetween.

A lever 7 encircles the section 3 and connects with the same, reciprocation of this lever serving to reciprocate the section 3 and this moving the section 3 from a position where the plate 5 is clamped between the two sections, to a position where this plate is unclamped by the sections and can therefore be swung between open and closing positions.

In the past, this type of valve has been provided with one mechanism for operating the lever 7 and an entirely separate mechanism for moving the valve plate 5. Such an arrangement necessitates two sources of power which is costly, and involves the hazard that the mechanism operating the lever 7 may not completely perform its function prior to operation of the mechanism swinging the valve plate, this causing straining of the valve parts and possibly putting the valve entirely out of commission.

According to the present invention, the casing 1 journals a shaft 8 parallel to the shaft 6, one end of this shaft 8 mounting a crank 9 which works the lever 7 through a connecting rod 10 and a bell crank 11. This shaft 8 is powered by a reversing motor 12 through a worm and gear 13. The arrangement of the crank 9 and the parts transmitting power from this crank to the lever 7, is such that the section 3 is reciprocated to the limit of its movement effecting unclamping of the plate as the crank 9 turns through one of its dead centers, and so that the section 3 is reciprocated to its opposite extreme as the crank 9 approaches its other dead center. A limit switch 14 operated by cams 15 on the shaft 8, is connected with the motor 12 so that when this motor is energized it turns the shaft 8 somewhat less than a complete revolution, at which time the motor is deenergized by the switch 14. The arrangement is such that the motor always stops when the crank 9 throws the lever 7 to a position causing movement of the section 3 to a position effecting clamping of the valve plate 5, and since this motor 12 is a reversing motor it can turn the shaft 8 in either direction between such extremes of movement.

During the time the crank 9 is turning through its dead center, and positions adjacent thereto, causing the lever 7 to move the section 3 to positions effecting unclamping of the plate 5, this crank and the shaft 8 turn through a considerable arc while the lever 7 and section 3 remain practically stationary, this being a characteristic of the action of the crank. Advantage is taken of this feature to transmit power from the shaft 8 to the plate 5 so as to swing the latter between its open and closed positions while the shaft 8 is turning the crank 9 through positions causing relatively little movement of the lever 7.

To obtain the above advantage, a lever 16 is fixed to the shaft 8 in such arrangement that this lever swings past the shaft 6 mounting the valve plate 5, while the crank 9 is turning through its dead center and while, consequently, the reciprocative section 3 is being held in unclamping positions. A lever 17 extends from the shaft 6 and has a cam slot 18 opening from its end, the lever 16 having a roller 19 on its end which enters this slot 18 as the lever 16 moves past the shaft 6, this throwing the lever 17, turning the shaft 6 and, in turn, throwing the valve plate 5 from open to closed positions or vice versa, depending on the moving direction of the lever 16. The ratio between the levers 16 and 17 is such that the valve plate is completely thrown from one of its extreme positions to the other while the crank 9 is turning through positions sufficiently close to its dead center to safely maintain the section 3 at positions effecting complete unclamping of the valve plate.

The lever 17 is fixed to the shaft 6 by way of a freely rotative bracket 20 which works through compression springs 21 on a saddle 22 keyed to the shaft 6. This arrangement is of particular advantage in that it permits the cam slot 18 to be made relatively long and the lever ratio to be proportioned so that the roller 19 does not completely disengage from the cam slot until it has given the lever 17 a push to an extent causing compression of one or the other of the springs 21, this firmly forcing the valve plate to its last moved position without involving strain on any of the parts. Furthermore, the cam slot 18 is outwardly flared so that the roller 19 can enter it even though the lever 17 may not quite be in its proper position, in which event the arrangement of the springs provides elasticity removing severe strain from the various parts.

The valve that has been described may be built in relatively large sizes. However, in the case of extremely large valves, it is desirable to operate the valve plate by means of a mechanism capable of exerting greater power, and such mechanism is illustrated by the other example shown by Figures 4 through 14.

In this case the valve plate 5 is swung by means of a gear segment 23, the valve being pivoted opposite this segment and the latter being curved to a radius about the pivoting axis of the valve. Swinging power is imparted to the plate 5 by way of a gear train 24. Actually, the gear segment 23 comprises a chain, the arrangement of the various parts being substantially as disclosed by my aforementioned patent.

In this instance, a shaft 25 powered by a reversing motor 26 through a worm and gear 27, drives a crank 28 through a worm and gear 29, and this crank reciprocates the lever 7 by way of a connecting rod 30 and a two-armed lever 31, the latter taking the place of the bell crank 11 of the first example. Here again the arrangement is such that the section 3 is reciprocated to the limit of its movement effecting unclamping of the plate 5 as the crank 28 turns through one of its dead centers, and so that the section 3 is reciprocated to its opposite extreme as the crank 9 approaches its other dead center, a limit switch 32 serving to deenergize the motor 26 as required to properly stop the crank 28. Since the valve is a big one, there is a much larger gear ratio between the motor 26 and the crank 28, but the principle is the same as is involved by the first example. That is to say, the action of the crank 28 causes reciprocation of the section 3 to unclamping positions, at which time the movement of the section becomes so slow that it is practically stationary for an interval of time while the crank 28 is turning through its dead center.

The shaft 25 also powers the gear train 24 to swing the valve plate 5 during the time the section 3 is in its unclamping phase of movement, a clutch 33 being interposed in the shaft 25 between the gear train 24 and the worm and gear 29 driving the crank 28, and this clutch being operated so that the gear train 24 is powered only during the time the crank 28 is turning through its dead center or positions sufficiently close to the same to hold the section 3 at unclamping positions. The gear ratio of the train 24 is proportioned to cause the valve plate 5 to be completely thrown from one of its extreme positions to the other while the crank 28 is turning through the positions just mentioned.

Operation of the clutch 33 is effected by a rocker 34 fixed to a toggle plate 35 worked by a toggle spring 36, the plate 35 operating the clutch 33 through a pin 37 working in a slot in a connecting link 38 which connects with the clutch 33. When the rocker 34 is rocked in either direction, the pin 37 works in the slot in the link 38 so that no operation of the clutch 33 occurs until the toggle spring 36 is swung past its dead center, whereupon the clutch 33 is snapped in or out. When the clutch is in its out or disengaged position, it locks with a fixed member 39 so as to positively lock the gear train 24 against movement, this consequently locking the valve plate 5.

Opposite ends of the rocker 34 carry rollers 40 and 41, that are laterally offset respecting each other, the roller 40 being worked by rotary cams 42 and 43 and the roller 41 being worked by a rotary cam 44, the latter cam being laterally offset respecting the cams 42 and 43. These various cams 42, 43 and 44 are simultaneously rotated in synchronism with the rotation of the crank 28, the cams being illustrated as mounted on the shaft which also mounts the crank 28.

Referring now to Figures 9 through 14, Figure 9 shows the positions of the above-mentioned parts when the valve is at rest with the section 3 tightly clamping the valve plate 5. When the motor 26 is energized the crank 28 starts to move the section 3 to its unclamping position, and as the crank 28 approaches its dead center the section 3 is moved sufficiently so that the valve plate 5 is loose. During this movement of the crank 28 the cam 44 has gradually moved the toggle plate, by working through the rocker 34 and roller 41, to a position where this toggle plate suddenly snaps into its other position and snaps in the clutch 33 so as to power the gear train 24. This phase is shown by Figure 10.

As operation continues, the crank 28 goes through its dead center and opposite reciprocation of the section 3 commences, the ratio of the gear train 24 being such that the valve plate 5 has now reached the other extreme of its movement. During this phase the cam 43 has been working against the roller 40, the latter having been moved into the path of this cam 43 when the clutch was thrown in. At this time, the toggle plate 35 through the action of its spring 36, is snapped to its original position so that the clutch disengages and simultaneously locks the gear train 24, this phase being shown by Figure 11. The motor 26 continues to operate until the crank 28 reaches a position where the section 3 is again in complete clamping position, the various cams being free to continue to turn. Figure 12 shows the position of the cams when the valve is at rest after completing the operating cycle described. When this phase is reached the limit switch 32 functions to deenergize the motor 26.

Figure 13:
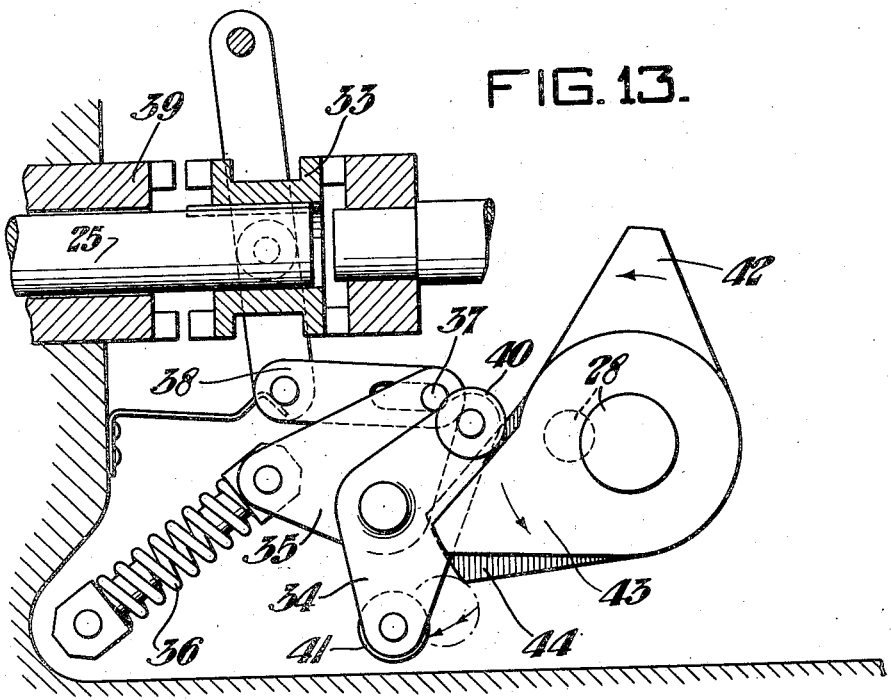
Figure 14:
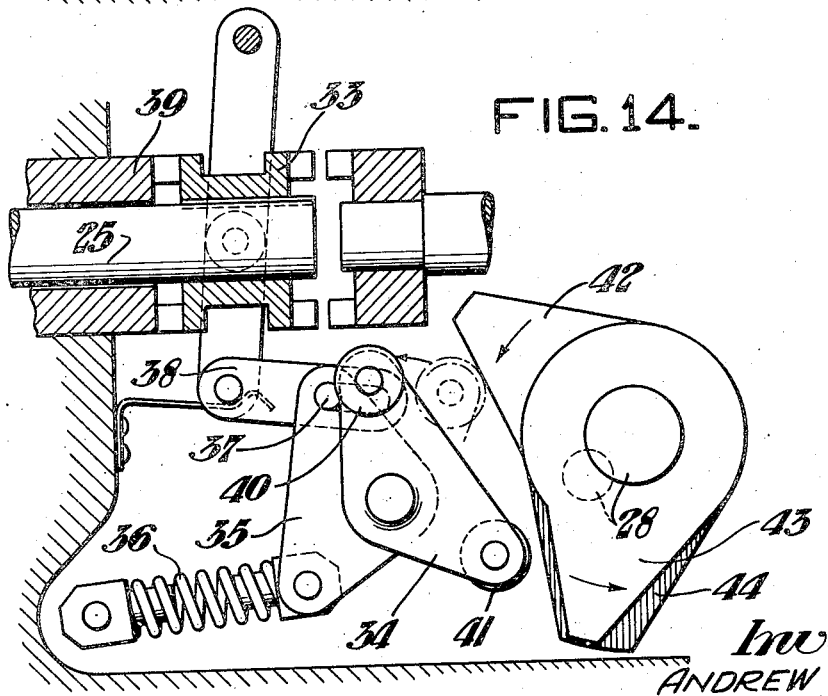

To return the valve plate 5 to its initial position, the motor 26 is reversed, this eventually resulting in the cam 44 engaging the roller 41, when the section 3 is moved to unclamping position, and causing powering of the gear train 24 by throwing in the clutch 33. This action of the cam and the clutch operating parts is shown by Figure 13. As clamping of the section 3 commences, the cam 42 works through the roller 40 to result in the clutch 33 being disengaged, this phase being shown by Figure 14, the cam continuing to turn with the crank 28 until the section 3 is in full clamping position, at which time the limit switch 32 again deenergizes the motor 26. The various parts are at this time as shown by Figure 9.

It will be appreciated from the foregoing that in the case of both examples a single reversing motor serves to operate the valve. Both examples embody the fundamental principle of using a crank to reciprocate the reciprocative fluid conducting section which clamps against the valve plate, the arrangement being such that this crank passes through its dead center when the reciprocative section reaches its range of unclamping positions. In both instances advantage is taken of the fact that the reciprocative section becomes practically stationary during the time the crank is turning through positions at and adjacent its dead center, to power the valve plate to effect its movement by gearing the valve plate to the crank shaft or its powering source by a gearing system having a ratio effecting movement of the valve plate before the crank turns sufficiently to again effect clamping of the valve plate by its movement of the reciprocative section. Obviously, a conventional push-button electric control system may be used to operate the motor from a remote point.

I claim:

1. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, and means for gearing said plate to said shaft and with a ratio moving said plate from full open to full closed positions while said crank is being turned by said shaft through its said dead center.

2. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, a shaft mounting said valve plate so it works by swinging between said sections, a lever for turning the second named shaft and a lever turned by the first named shaft, said levers being positioned to interengage while said crank is turning through its said dead center and to be free at other times.

3. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, a shaft mounting said valve plate so it works by swinging between said sections, a lever for turning the second named shaft and a lever turned by the first named shaft, said levers being positioned to interengage while said crank is turning through its said dead center and to be free at other times, at least one of said levers being elastically associated with the one of said shafts it turns.

4. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, a shaft mounting said valve plate so it works by swinging between said sections, a lever for turning the second named shaft, said lever having a cam slot opening from its end, and a lever turned by the first named shaft with a member on its swinging end that enters said cam slot and throws the first named lever while said crank is turning through its said dead center.

5. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, a shaft mounting said valve plate so it works by swinging between said sections, a lever for turning the second named shaft, said lever having a cam slot opening from its end, and a lever turned by the first named shaft with a member on its swinging end that enters said cam slot and throws the first named lever while said crank is turning through its said dead center, the first named lever being elastically associated with the second named shaft.

6. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, a shaft mounting said valve plate so it works by swinging between said sections, a lever for turning the second named shaft, said lever having a cam slot opening from its end, and a lever turned by the first named shaft with a member on its swinging end that enters said cam slot and throws the first named lever while said crank is turning through its said dead center, the first named lever being elastically associated with the second named shaft and the ratios of said levers being proportioned to effect complete movement of said plate while said crank is turning through positions sufficiently close to its said dead center to maintain said reciprocative section at a position effecting unclamping of said plate.

7. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, a shaft mounting said valve plate so it works by swinging between said sections, a lever for turning the second named shaft, said lever having a cam slot opening from its end, and a lever turned by the first named shaft with a member on its swinging end that enters said cam slot and throws the first named lever while said crank is turning through its said dead center, the first named lever being elastically associated with the second named shaft and the ratios of said levers being proportioned to effect complete movement of said plate while said crank is turning through positions sufficiently close to its said dead center to maintain said reciprocative section at a position effecting unclamping of said plate, said cam slot in the first named lever being sufficiently long so that said member on the second named lever does not disengage therefrom until the first named lever elastically urges said plate to move beyond one of its swinging limits.

8. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, a shaft mounting said valve plate so it works by swinging between said sections, a lever for turning the second named shaft and a lever turned by the first named shaft, said levers being positioned to interengage while said crank is turning through its said dead center and to be free at other times, the ratios of said levers being proportioned to effect complete movement of said plate while said crank is turning through positions at and adjacent its dead center.

9. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, said valve plate being pivoted to work between said sections by swinging and having an operating gear segment curved to a radius about its pivot, a gear meshing with said segment, means including a clutch for powering said gear by said powered shaft, and means for throwing said clutch in while said crank turns through its dead center and positions adjacent thereto and for throwing said clutch out while said crank turns through other positions.

10. A valve including opposed fluid conducting sections, a valve plate working between said sections, at least one of said sections being reciprocative to effect clamping and unclamping of said plate between said sections, a crank, a connecting rod worked by said crank for powering said reciprocative section to move to a position effecting unclamping of said plate as said crank turns through its dead center, a powered shaft for turning said crank, said valve plate being pivoted to work between said sections by swinging and having an operating gear segment curved to a radius about its pivot, a gear meshing with said segment, means including a clutch for powering said gear by said powered shaft, and means for throwing said clutch in while said crank turns through its dead center and positions adjacent thereto and for throwing said clutch out while said crank turns through other positions, the first named means including gearing of such ratio as to effect complete movement of said valve plate by said gear and segment while said crank is turning through its said dead center and positions adjacent thereto.

ANDREW BOWLAND.